United States Patent

Scheiner et al.

[15] 3,635,697
[45] Jan. 18, 1972

[54] RECOVERY OF GOLD

[72] Inventors: Bernard J. Scheiner, Sparks; Roald E. Lindstrom, Reno, both of Nev.

[73] Assignee: The United States of America as represented by the Secretary of the Interior

[22] Filed: Sept. 30, 1969

[21] Appl. No.: 862,445

[52] U.S. Cl. ..........................75/101 R, 75/101 BE, 75/118
[51] Int. Cl. .........................................................C22b 11/04
[58] Field of Search ..........................75/101 R, 101 BE, 118; 260/430, 429 J

[56] References Cited

UNITED STATES PATENTS

| | | | |
|---|---|---|---|
| 2,648,601 | 8/1953 | Byler et al. | 75/105 |
| 2,753,258 | 7/1956 | Burstall et al. | 75/118 |
| 2,839,389 | 6/1958 | Kember et al. | 75/118 |
| 3,542,540 | 11/1970 | Heinen et al. | 75/101 |

*Primary Examiner*—L. Dewayne Rutledge
*Assistant Examiner*—G. T. Ozaki
*Attorney*—Ernest S. Cohen and William S. Brown

[57] ABSTRACT

Gold is recovered from dilute solution by complexing with malononitrile, followed by sorption on, and elution from, an anion-exchange resin having both weakly basic and strongly basic groups.

5 Claims, No Drawings

RECOVERY OF GOLD

Recovery of gold from ores is conventionally accomplished by leaching with cyanide solution. According to this process, crushed gold-bearing ore is contacted with aqueous cyanide solution in the presence of oxygen to form the soluble aurocyanide complex, $Au(CN)_2^-$. The gold is then recovered from the resulting cyanide leach slurry by a variety of processes including sorption of the complex on strongly basic ion exchange resin (U.S. Pat. No. 2,753,258) and on an exchange resin containing both strongly basic and weakly basic groups (U.S. Pat. Nos. 3,001,868 and 3,317,313). However, the affinity of these resins for the $Au(CN)_2^-$ complex is very high and elution of the complex from the resin has proven to be a strong deterrent to practical application of resins for processing the leach slurries, particularly where the slurry is obtained from leaching of low-grade ores.

It has now been found, according to the process of the invention, that the difficulties of the prior art processes can be largely overcome by the use of malononitrile, rather than cyanide, as complexing agent. Leaching with malononitrile solution is accomplished in essentially the same manner as with cyanide solution, i.e., the crushed gold-bearing ore is contacted with aqueous malononitrile solution. The presence of oxygen is, however, not essential. In addition, effective leaching with malononitrile requires the use of a basic solution, suitably having a pH of about 10 to 12. This pH value is conveniently and economically achieved by addition of lime to the leach solution; however, other bases such as sodium hydroxide may also be used for this purpose. The concentration of the malononitrile in the solution is usually from about 0.05 to 0.25 percent by weight, and the ratio of malononitrile solution to ore will generally range from about 1.5 to 3. Optimum values of these variables will, however, vary considerably depending on the type of and amount of ore, as well as the type of resin used for subsequent recovery of the complex.

Although preparation of the malononitrile complex is similar to that of the cyanide complex, the two are not analogous. The bonding orbital between gold and cyanide in the gold-cyanide complex is SP hybridized, whereas in the malononitrile-gold complex the bonding orbital is $SP^3$ hybridized. Malononitrile in basic solution forms the malononitrile carbanion which attacks gold to form a negatively charged species which has the probable formula $Au[CH(CN)_2]_2^-$.

Following leaching, the gold, in the form of the malononitrile complex, is recovered from the leach solution by sorption on an ion-exchange resin having both weakly basic and strongly basic groups. These ion exchange resins are conventional and are disclosed in the above-mentioned U.S. Pat. No. 3,001,868 and 3,317,313. It has now been found, however, that the effectiveness of these resins for recovery of gold from leach solutions is much greater in the case of the malononitrile complex than in the case of the cyanide complex. Furthermore, the malononitrile complex is much more readily eluted from the resin. As a result the use of malononitrile as complexing agent results in a process that is practical for recovery of gold from dilute solutions, even where the solutions are obtained from leaching of low-grade gold ores or other source materials.

As stated above, the anion-exchange resins employed in the process of the invention are conventional and a wide variety of suitable resins will be apparent to those skilled in the art. However, the preferred resin consists of a poly(styrene-divinylbenzene) matrix having quaternary ammonium groups as strong-base functional exchange groups and tertiary amine groups as weak-base functional exchange groups. These are conventionally prepared by chloromethylation of the copolymer matrix beads, followed by swelling of the beads in an organic swelling agent and reaction of the resulting beads with a secondary amine to convert the chloromethyl groups to tertiary amine groups. The resulting weak-base resin is then reacted with an alkyl halide or sulfate to convert a portion of the tertiary amine groups to strongly basic quaternary ammonium groups.

The optimum amount of resin employed for sorption of the gold will depend on a variety of factors such as the specific resin employed, concentration of gold in the original solution, types and amounts of other metallic ions in the solution, etc., and is best determined empirically. The resin and the solution of the malononitrile-gold complex may be contacted by means of any conventional procedures, such as addition of the resin, in the form of beads or granules, to the solution, or by passing the solution through a column of the resin. For optimum sorption of the gold complex, the pH of the solution should be in the range of about 10 to 12.

Recovery of the gold from the resin is conveniently accomplished by elution. The preferred eluants are the mineral acids, i.e., sulfuric acid, nitric acid or hydrochloric acid. Other eluants such as liquid ion exchangers containing a $R_4N^+$ group may, however, also be used. When a mineral acid is employed, the preferred concentration of acid in the solution is about 10 percent by weight; however, concentrations of about 1 to 10 percent may be used.

The invention and its advantages will be more specifically illustrated by the following example.

EXAMPLE

Two-thousand grams of a carbonaceous ore containing 0.25 ounce gold per ton of ore was slurried with 6 liters of water. Five grams of malononitrile, 20 g. of lime and 200 ml. (approximately 70 g.) of 20–40 mesh granular anion-exchange resin were then added to the slurry. The resin was the preferred type described above, having both weakly basic and strongly basic amine functional exchange groups and was in the chloride form. The resulting slurry had a pH of about 11.5.

The slurry was stirred for 24 hours and the resin removed by screening. The resin was found to contain 80 percent by weight of the gold in the original ore sample.

The gold-containing resin was then placed in a ¼-inch diameter column and eluted with 10 percent sulfuric acid. Elution of the gold was nearly complete with 125 ml. of the acid. Similar results were obtained using 10 percent nitric and 10 percent hydrochloric acids.

Experiments were then run using sodium cyanide instead of malononitrile as the complexing agent. The pH of the ore slurry was adjusted to 11 and ample oxygen was supplied to the slurry by agitation. These experiments were otherwise identical to those above using malononitrile. Use of cyanide as complexing agent resulted in only 63 percent by weight extraction of the gold into the resin and only 5 percent of the gold was eluted from the resin. Thus, the use of malononitrile have distinctly superior results both in extraction and elution.

What is claimed is:

1. A method of recovering gold from dilute aqueous solution comprising complexing the gold in solution with malononitrile, sorbing the malononitrile-gold complex on anion-exchange resins having both weakly basic and strongly basic amine groups as the functional exchange groups, and recovering the gold in acidic aqueous solution from the anion-exchange resin by elution with a mineral acid.

2. The method of claim 1 in which the solution of malononitrile-gold complex is formed by leaching of gold ores with an aqueous solution of malononitrile.

3. The method of claim 1 in which the pH of the aqueous solution of malononitrile-gold complex is from about 10 to 12.

4. The method of claim 1 in which the weakly basic amine groups of the anion-exchange resin are tertiary amine groups and the strongly basic amine groups are quaternary ammonium groups.

5. The method of claim 1 in which the mineral acid is sulfuric acid.

* * * * *